United States Patent
Zhang

(10) Patent No.: US 8,749,728 B2
(45) Date of Patent: Jun. 10, 2014

(54) BACKPLANE AND LCD DEVICE COMPRISING BACKPLANE

(75) Inventor: Yanxue Zhang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 128 days.

(21) Appl. No.: 13/515,277

(22) PCT Filed: Apr. 28, 2012

(86) PCT No.: PCT/CN2012/074925
§ 371 (c)(1),
(2), (4) Date: Jun. 11, 2012

(87) PCT Pub. No.: WO2013/143202
PCT Pub. Date: Oct. 3, 2013

(65) Prior Publication Data
US 2013/0258233 A1  Oct. 3, 2013

(30) Foreign Application Priority Data
Mar. 30, 2012 (CN) .......................... 2012 1 0089474

(51) Int. Cl.
*G02F 1/1333* (2006.01)
(52) U.S. Cl.
USPC ........................................................ 349/58
(58) Field of Classification Search
CPC .................... G02F 1/133328; G02F 1/133314
USPC ........................................................ 349/58
See application file for complete search history.

(56) References Cited

U.S. PATENT DOCUMENTS

| | | | |
|---|---|---|---|
| 6,181,390 B1* | 1/2001 | Wang et al. | 349/58 |
| 6,966,617 B2* | 11/2005 | Chen et al. | 312/7.2 |
| 7,515,403 B2* | 4/2009 | Hong | 361/679.22 |
| 7,665,879 B2* | 2/2010 | Hsieh | 362/633 |
| 8,488,078 B2* | 7/2013 | Kim | 349/58 |
| 2008/0074877 A1 | 3/2008 | Hsieh | |
| 2010/0225845 A1 | 9/2010 | Liu | |

FOREIGN PATENT DOCUMENTS

| | | |
|---|---|---|
| CN | 1662124 A | 8/2005 |
| CN | 101226302 A | 7/2008 |
| CN | 101241268 A | 8/2008 |

(Continued)

OTHER PUBLICATIONS

Shang Aixue, The International Searching Authority written comments, Jan. 2013, CN.

*Primary Examiner* — James Dudek
(74) *Attorney, Agent, or Firm* — IPro, Inc.; Na Xu

(57) ABSTRACT

The invention relates to the field of LCDs, and more particularly to a backplane and an LCD device including the backplane. The backplane includes a frame and a bottom plate; the frame is of a joining structure, and includes a plurality of frame edge members; the frame edge members are equilong. The backplane of the invention employs a modular design, the frame of the backplane is divided into a plurality of equilong frame edge member units, and the design is standardized. When the new products of LCD devices are developed, only frame edge members of different number are selected from the standardized modular units for combination and use. The members have a high generality, thereby reducing the development cost of special moulds, shortening the development cycle of products, avoiding the problem that a great deal of stagnant materials are inconveniently handled when developing a single device. Thus, the aim of reducing cost is achieved.

18 Claims, 3 Drawing Sheets

(56) References Cited

FOREIGN PATENT DOCUMENTS

| | | |
|---|---|---|
| CN | 201226214 Y | 4/2009 |
| CN | 201562101 U | 8/2010 |
| CN | 101893211 A | 11/2010 |
| CN | 201672468 U | 12/2010 |
| CN | 102287680 A | 12/2011 |
| CN | 102364384 A | 2/2012 |
| KR | 20060019171 A | 3/2006 |
| TW | 200537397 A | 11/2005 |

* cited by examiner

BACKPLANE AND LCD DEVICE COMPRISING BACKPLANE

TECHNICAL FIELD

The invention relates to the field of liquid crystal displays (LCDs), and more particularly to a backplane and an LCD device comprising the backplane.

BACKGROUND

Conventional LCD devices in mass production include light guide panels (LGPs), reflectors, and optical films. The components are generally fixed on backplanes. The manufacturing process of the backplanes includes integrated punching, radium welding, and so on. The sizes of the backplanes of all the modules are inconsistent, thereby requiring independent design and manufacturing of the backplanes, as well as manufacturing corresponding special moulds. The moulds have a long development cycle and cannot be shared. Thus, the production cost of the backplane is restricted from being further reduced, and the development cycle of LCD devices is restricted from being further shortened.

SUMMARY

In view of the above-described problems, the aim of the invention is to provide a backplane that is modular, joining-type, and low-cost and an LCD device comprising the backplane.

A first technical scheme of the invention is that: a backplane comprises a frame and a bottom plate; the frame is of a joining structure, and comprises a plurality of frame edge members. The frame edge members are equilong. The backplane further comprises four frame corner members. Each of four edges of the frame is joined by one or more frame edge members. A universal interface structure is arranged between the frame members, and the universal interface structure is also arranged between the frame members and the frame corner members. The interface structure comprises a convex lug(s) arranged on one member and a groove(s) correspondingly arranged in another member. The convex lug is limited in the groove, and the bottom plate is a grid structure formed by joining a plurality of frame bars.

A second technical scheme of the invention is that: a backplane comprises a frame and a bottom plate; the frame is of a joining structure, and comprises a plurality of frame edge members; the frame edge members are equilong.

Preferably, the backplane further comprises four frame corner members; the frame corner members can improve the intensity at the frame corners.

Preferably, each of four edges of the frame is joined by one or more frame edge members, to form a backplane with different length and width.

Preferably, a universal interface structure is arranged between the frame members.

Preferably, a universal interface structure is arranged between the frame members and the frame corner members.

Preferably, the interface structure comprises a convex lug(s) arranged on one member, and a groove(s) correspondingly arranged in another member. The convex lug is limited in the groove. The positioning structure of the convex lug and the groove can prevent two members joined together from relatively rotating with a screw or a rivet as an axis, thereby improving the structural strength of the backplane.

Preferably, the interface structure is a convex lug arranged on one member; the convex lug is attached to a main body of an adjacent member.

Preferably, the bottom plate is formed by joining a plurality of baffles having the same size. The bottom plate of the backplane is of a detachable structure, which is joined and assembled. The design is a development of the modular design, and can reduce cost and shorten development cycle.

Preferably, the bottom plate is a grid structure formed by joining a plurality of frame bars. Thus, the material of the bottom plate is saved, and the cost is reduced.

A third technical scheme of the invention is that: an LCD device comprises the backplane mentioned above.

Advantages of the invention are summarized below. The backplane of the invention employs modular design. The frame of the backplane is divided into a plurality of equilong frame edge member units, and the design is standardized. When the new products of LCD devices are developed, only frame edge members of different number are selected from the standardized modular units for combination and use. The members have high generality, thereby reducing the development cost of special moulds, shortening the development cycle of products, avoiding the problem that a great deal of stagnant materials are inconveniently handled when developing single devices. Thus, the aim of reducing cost is achieved.

Figure 1:
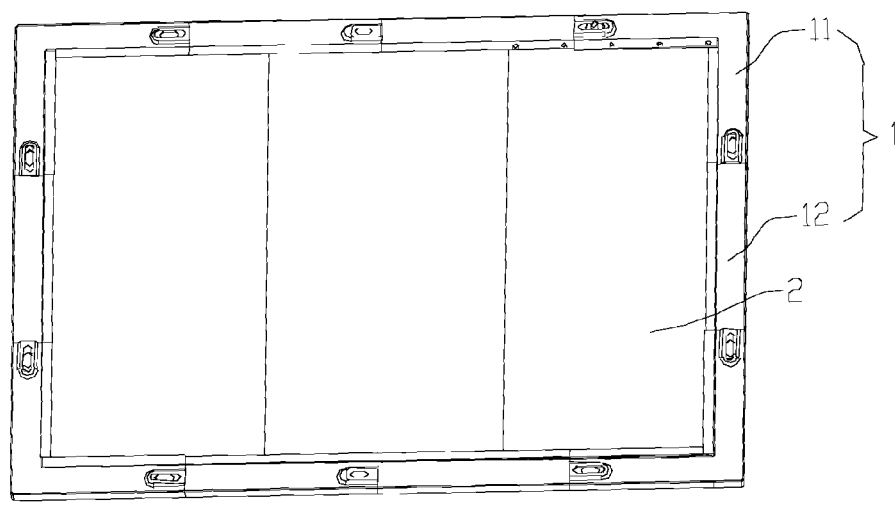
FIG. 1 is an assembly diagram of a backplane of a first example of the invention.
Figure 2:
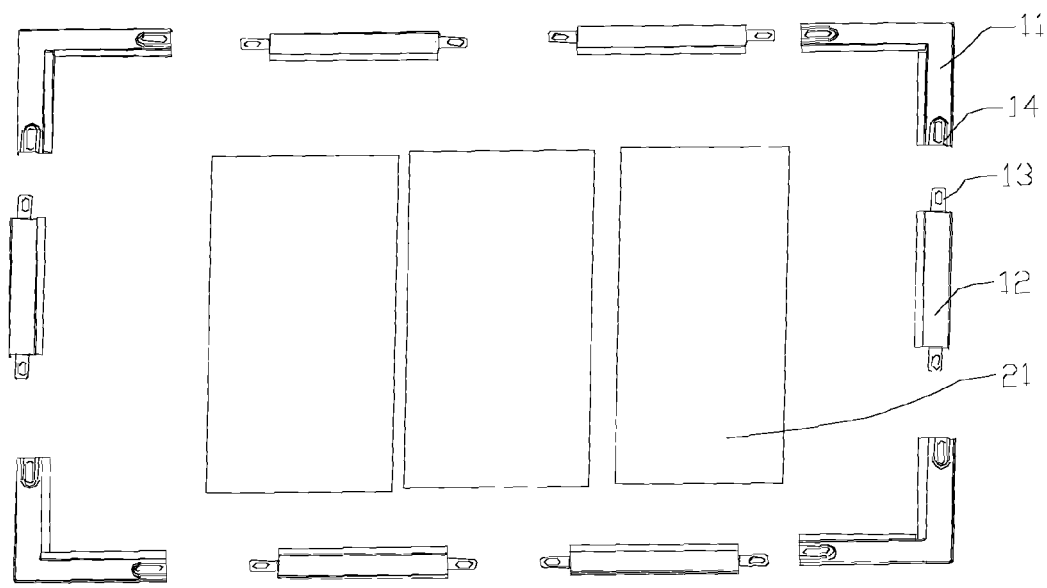
FIG. 2 is a disassembly diagram of a backplane of a first example of the invention.

Legends: 1. frame; 11. frame corner member; 12. frame edge member; 13. convex lug; 14. groove; 2. bottom plate; 21. baffle; 22. frame bar; 3. screw.

DETAILED DESCRIPTION

The invention provides an LCD device. The LCD device comprises a backplane. FIGS. 1-5 show a first example 1 of the backplane of the invention. The backplane comprises a frame 1 and a bottom plate 2; the frame 1 is of a joining structure, and comprises four frame corner members 11 and a plurality of equilong frame edge members 12.

In the example, each of the four edges of the frame is joined by one or more frame edge members 12. Specifically, the frame comprises two frame edge members 12 in the length direction, and one frame edge member 12 in the width direction. The frame edge member 12 and the frame corner member 11, and the frame edge member 12 and the frame edge member 12 are respectively screwed by a screw or riveted by a rivet. Thus, two adjacent members are quickly joined. The frame corner members 11 can improve the intensity at the frame corners of the backplane.

The backplane of the invention employs a modular design, and the frame 1 of the backplane is divided into multiple units of frame corner members 11 and equilong frame edge members 12, and the design is standardized. When the new products of LCD devices are developed, only frame corner members 11 and frame edge members 12 of different number are selected from the standardized modular units for combination and use. The members have a high generality, thereby reducing the development cost of special moulds, shortening the development cycle of products, and avoiding the problem that a great deal of stagnant materials are inconveniently handled when developing single devices. Thus, the aim of reducing cost is achieved.

If the four frame corner members 11 are of the same size, backplanes of different size can be formed by joining only one type of frame corner members 11 and one type of frame edge members 12; thus, the number of the required moulds becomes less, and the generality becomes higher.

Figure 3:
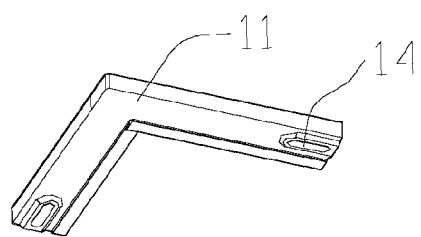
FIG. 3 is a structure diagram of a frame corner member as shown in FIG. 1.
Figure 4:
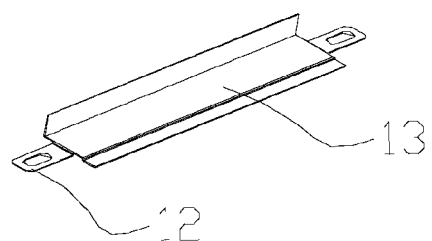
FIG. 4 is a structure diagram of a frame edge member as shown in FIG. 1.
Figure 5:
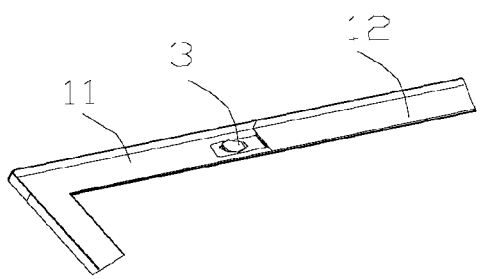
FIG. 5 is a structure diagram of a corner member joined with a frame edge member as shown in FIG. 1.

A universal interface structure is arranged between the frame edge members and the frame corner members. Specifically, in the example, the interface structure comprises a convex lug 13 arranged on one member, and a groove(s) 14 correspondingly arranged in another member; the convex lug 13 is limited in the groove 14. As shown in FIG. 3 and FIG. 4, the frame corner member 11 is provided with the groove(s) 14, the frame edge member 12 connected with the frame corner member 11 is correspondingly provided with the convex lug(s) 13, the convex lug 13 is limited in the groove 14, and the convex lug 13 and the groove 14 are provided with a through hole. A screw 3 penetrates the through hole and locks the frame corner member 11 and the frame edge member 12. The positioning structure of the convex lug 13 and the groove 14 can prevent two members joined together from relatively rotating with a screw or a rivet as an axis, thereby improving the structural strength of the backplane.

The universal interface structure can also be arranged between the frame edge members 12 of the invention. The interface structure in the example comprises convex lugs 13 arranged on the two connected frame edge members 12, respectively. The convex lugs 13 are attached to a main body of an adjacent frame edge member, and are locked by screws or rivets. Optionally, the matching structures of grooves and convex lugs mentioned above can also be arranged between the frame edge members 12.

As a simple deformation of the aforementioned example, the frame corner member is provided with a convex lug, the frame edge member connected with the frame corner member is correspondingly provided with a groove, and the convex lug is limited in the groove, thereby achieving the aim as well.

In the example, the bottom plate 2 is formed by joining a plurality of baffles 21 having the same size. The baffles 21 are arranged on the frame 1 by welding, screwing, or riveting. The bottom plate of the backplane is of a detachable structure, which is joined and assembled. The design is a development of the modular design, and can reduce cost and shorten development cycle.

Figure 6:
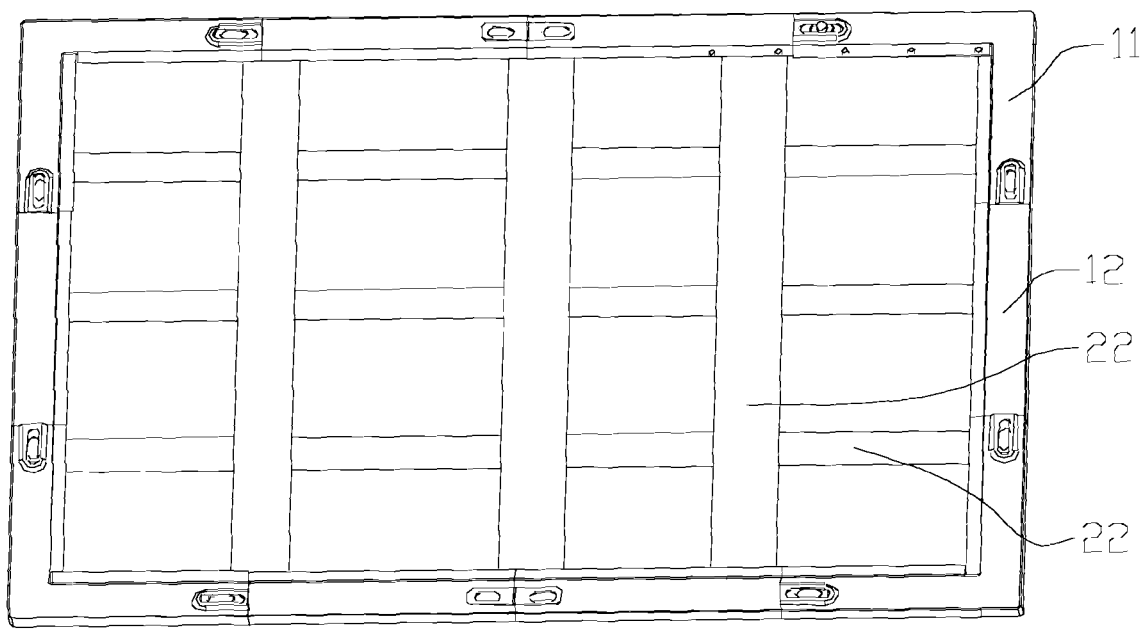
FIG. 6 is an assembly diagram of a backplane of a second example of the invention.

FIG. 6 shows a second example of the backplane of the invention. The bottom plate 2 is a grid structure formed by joining a plurality of frame bars 22. The example has the advantages of saving the material of the bottom plate 2, and reducing cost as well as having the advantages as the first example.

Optionally, the backplane of the invention can only comprise a plurality of equilong frame edge members without using frame corner members. The two frame edge members at the frame corner are vertically joined and fixed by a special structure, and the frame edge members of the frame edges are joined by universal interfaces from beginning to end. Thus, the modular design can be achieved as well, and the corresponding advantages can be obtained.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim

1. A backplane, comprising: a frame and a bottom plate; wherein said frame is of a joining structure, and comprises a plurality of frame edge members; length of each of said frame edge members is equal; said backplane further comprises four frame corner members, and each of four edges of said frame is joined by at least two frame edge members; a universal interface structure is arranged between said frame edge members, and the universal interface structure is further arranged between said frame edge members and said frame corner members; said interface structure comprises a convex lug(s) arranged on one member, and a groove(s) correspondingly arranged in another member; said convex lug is limited in said groove; and said bottom plate is a grid structure formed by joining a plurality of frame bars.

2. A backplane, comprising: a frame and a bottom plate; wherein said frame is of a joining structure, and comprises a plurality of frame edge members; and length of each of said frame edge members is equal, wherein each of four edges of said frame is joined by at least two frame edge members.

3. The backplane of claim 2, wherein said backplane further comprise four frame corner members.

4. The backplane of claim 2, wherein a universal interface structure is arranged between said frame edge members.

5. The backplane of claim 3, wherein a universal interface structure is arranged between said frame edge members and said frame corner members.

6. The backplane of claim 4, wherein said interface structure comprises a convex lug(s) arranged on one member, and a groove(s) correspondingly arranged on a surface of the end part of another member; and said convex lug is fixed in said groove by a screw.

7. The backplane of claim 5, wherein said interface structure comprises a convex lug(s) arranged on one member, and a groove(s) correspondingly arranged in another member; and said convex lug is limited in said groove.

8. The backplane of claim 4, wherein said interface structure is a convex lug arranged on one member; and said convex lug is attached to a main body of an adjacent member.

9. The backplane of claim 5, wherein said interface structure is a convex lug arranged on one member; and said convex lug is attached to a main body of an adjacent member.

10. The backplane of claim 2, wherein said bottom plate is formed by joining a plurality of baffles having the same size.

11. The backplane of claim 2, wherein said bottom plate is a grid structure formed by joining a plurality of frame bars.

12. An LCD device, comprising: a backplane; wherein said backplane comprises a frame and a bottom plate; said frame is of a joining structure, and comprises a plurality of frame edge members; and length of each of said frame edge members is equal, wherein each of four edges of said frame is joined by at least two frame edge members.

13. The backplane of claim 12, wherein said backplane further comprise four frame corner members.

14. The LCD device of claim 12, wherein a universal interface structure is arranged between said frame edge members.

15. The LCD device of claim 13, wherein a universal interface structure is arranged between said frame edge members and said frame corner members.

16. The LCD device of claim 14, wherein said interface structure comprises a convex lug(s) arranged on one member, and a groove(s) correspondingly arranged on a surface of the end part of another member; and said convex lug is fixed in said groove by a screw.

17. The LCD device of claim 12, wherein said bottom plate is formed by joining a plurality of baffles having the same size.

18. The LCD device of claim 12, wherein said bottom plate is a grid structure formed by joining a plurality of frame bars.

* * * * *